(12) United States Patent
Huynh et al.

(10) Patent No.: US 7,439,944 B2
(45) Date of Patent: *Oct. 21, 2008

(54) LIGHT EMITTING DIODE MULTIPHASE DRIVER CIRCUIT AND METHOD

(75) Inventors: Kimlong Huynh, Santa Ana, CA (US); Vinhphu Quoc Tran, Fountain Valley, CA (US)

(73) Assignee: Lite Style Electronics, LLC, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/439,065

(22) Filed: May 22, 2006

(65) Prior Publication Data

US 2006/0208669 A1    Sep. 21, 2006

Related U.S. Application Data

(63) Continuation-in-part of application No. 11/050,991, filed on Feb. 4, 2005, now Pat. No. 7,081,722.

(51) Int. Cl.
*G09G 3/32* (2006.01)
*G05F 1/00* (2006.01)

(52) U.S. Cl. .......................... 345/82; 345/83; 345/84; 315/291; 315/185 S; 315/200 A; 315/312

(58) Field of Classification Search ......... 315/312–325, 315/185 S, 200 A, 362, 291, 307; 362/800–812; 345/82–84
See application file for complete search history.

(56) References Cited

U.S. PATENT DOCUMENTS

| 5,457,450 | A | * | 10/1995 | Deese et al. | 340/912 |
| 5,663,719 | A | * | 9/1997 | Deese et al. | 340/912 |
| 7,327,051 | B2 | * | 2/2008 | Ito et al. | 307/10.8 |
| 2006/0197722 | A1 | * | 9/2006 | Nakajima | 345/83 |
| 2006/0256050 | A1 | * | 11/2006 | Ikeda | 345/82 |
| 2007/0229416 | A1 | * | 10/2007 | De Oto | 345/82 |

* cited by examiner

*Primary Examiner*—Tuyet Vo
(74) *Attorney, Agent, or Firm*—J.C. Patents

(57) ABSTRACT

A method and a circuit for driving light emitting diodes (LEDs) in multiphase are provided. A string of LEDs divided into groups connected to each other in series is provided. Each group is coupled to ground through separate conductive paths. A phase switch is provided in each conductive path. Increasing the input voltage turn on the string of LEDs, group by group in the sequence downstream the string. To reduce power dissipation, the phase switch of an upstream group is turned off when next downstream group is turned on.

6 Claims, 17 Drawing Sheets

DRIVE STRINGS OF LED IN MULTIPHASE n is any positive integer

Examples of group combination. Each group can be the same or different from one another x, y, z are any positive integers

ALTERNATIVES FOR Q1, Q2, Q3, & Q4

ALTERNATIVES FOR Q1, Q2, Q3, & Q4

LIGHT EMITTING DIODE MULTIPHASE DRIVER CIRCUIT AND METHOD

CROSS-REFERENCE TO RELATED APPLICATION

This application is a continuation-in-part of application Ser. No. 11/050,991 filed on Feb. 4, 2005, now U.S. Pat. No. 7,081,722.

BACKGROUND OF THE INVENTION

1. Field of the Invention

The present invention relates to a method for driving a string of light emitting diodes (LEDs) in multiphase. More particularly, the method of the present invention drives a string of LEDs divided into groups, the groups of LEDs are turned on in sequence as the voltage applied to the string of LEDs gradually increases. The present invention also relates to a light emitting diode driver circuit for driving a string of LEDs in multiphase.

2. Description of Related Art

To drive a LED, it is necessary to provide correct voltage and/or current level. In many applications, multiple LEDs are used to provide the needed light output. LEDs can be connected either in parallel or in series or a combination of both.

In applications where the power source is periodic (such as off-line applications), the LED driver's task is to convert this time varying voltage to the correct voltage and/or current level. Such task requires circuitry commonly called ac/dc converters. These converters employ magnetic (inductor or transformer), capacitor, and/or other components, which are large in size. Certain type of capacitor such as Aluminum Electrolytic Capacitor (AEC) has short life and reduces system reliability.

Certain applications require power factor correction (PFC) where the power source's current is shaped to follow closely the power source voltage waveform. To achieve PFC, special circuits are used that often require energy hold up capacitors, more magnetic and other components.

SUMMARY OF THE INVENTION

The present invention provides a method for driving light emitting diodes (LED) in multiphase. The method comprises providing a string of LEDs. The string of LEDs contains a plurality of groups of LEDs, these groups of LEDs are electrically connected to each other in series, and each group is separately coupled to a ground. One group represents one phase of the string. As these groups or phases of the string are electrically connected in series, each group or phase of LEDs is turned on at a different voltage level. By increasing the input voltage of a power source, the group immediately downstream the power source will be turned on first, and the groups downstream the string will be turned on in turn with the increase of the input voltage. A phase switch is provided for each group. Each phase switch is coupled between a corresponding group and the ground. The switch of an upstream group can be turned off before or after a downstream group is turned on to reduce power dissipation or to provide dimming effect.

The present invention also provides a driver circuit for driving light emitting diodes (LEDs) in multiphase. The driver circuit comprises a plurality of LEDs divided into groups, the groups are electrically connected to each other in series. Each group is electrically connected to a phase switch which in turn is electrically connected to a ground. Each group may contain one or more LEDs of the same or different kind, color, and value, and one or more resistors, connected in any suitable ways. An active current control circuit, a dimming circuit, a PFC circuit, and an over-voltage protection circuit can be combined into the driver circuit of the present invention.

DETAILED DESCRIPTION OF THE PREFERRED EMBODIMENTS

Figure 1:
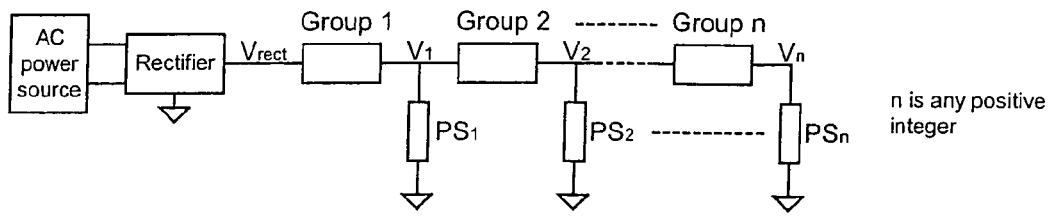
FIG. 1 illustrates a conceptual circuit of the present invention.

FIG. 1 shows a conceptual circuit of a multiphase LED driver of the present invention. The LED driver circuit is powered by a power source such as an alternative current (AC) power source. The AC source is rectified by a rectifier circuit. The rectified voltage $V_{rect}$ is then applied to a string of light emitting diodes (LEDs). The AC power source can be any kind of alternative current sources and their step up/down variations. The rectifier circuit can be any conventional rectifier circuit capable of rectifying an AC power source. If desirable, a direct current (DC) power source can be used to replace the AC power source.

Light emitting diode (LED) as used herein is the general term for many different kinds of light emitting diode, such as traditional LED, super-bright LED, high brightness LED, organic LED, etc. The invention is applicable to all kinds of LED.

In the driver circuit shown in FIG. 1, a string of LEDs is electrically connected to the power source. The string of LEDs are divided into an n number of groups, where n is a positive integer. N is herein referred to as the number of phase of the driver circuit. Groups 1, 2, . . . and n are electrically connected to each other in series. Each group represents one phase.

Figure 2:
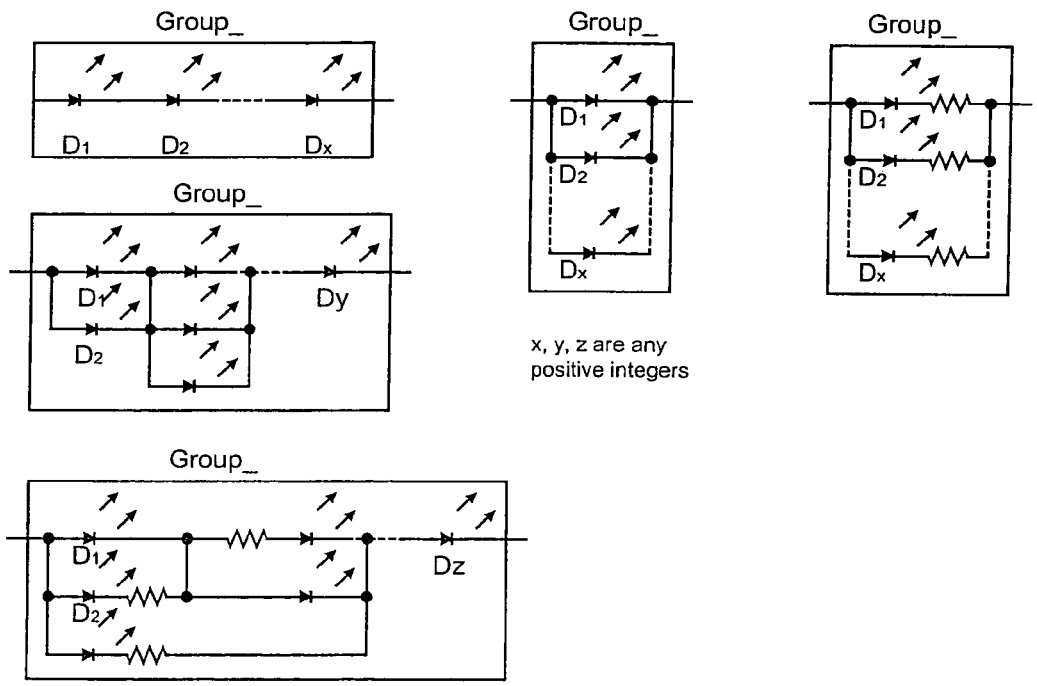
FIG. 2 illustrates examples of different combination and arrangement of LEDs and resistors in a group. Each group can be the same or different from one another.

Each group is a combination of one or more LEDs, and in some cases also with resistor(s). The number of LEDs and resistors in each group can be the same or different from other group. The LEDs in each group can be a combination of the same or different kind. They can be a combination of the same or different color. They can be connected in serial or parallel or a mixture of both. FIG. 2 illustrates some of these combinations.

There provided phase switches $PS_1, PS_2 \ldots PS_n$ in the LED driver circuit. Each of the phase switches is electrically connected to a corresponding group at one end and to the ground at the other end. The voltages at the joint points between the groups and the corresponding phase switches are phase voltage and denoted by $V_1, V_2, \ldots V_n$, respectively. The phase switch can be a current limited current sink, a switch, or a switch connected in series with resistor(s). The phase switch is a general term to indicate any device that, when turned on, conducts electrical current. Examples of the phase switch include, but not limited to, a N-Channel MOSFET, a P-Channel MOSFET, a NPN bipolar transistor, a PNP bipolar transistor, an Insulated Gate Bipolar Transistor (IGBT), an analog switch, a relay, etc. The "off" and "on" of each of the phase switch can be controlled individually.

The multiphase driver circuitry of the present invention can turn on/off each phase or each group of LEDs successively at a right power source voltage level. As the voltage of the power source increases enough to power the first LED group which is located immediately downstream the power source (Group 1 as shown in FIG. 1), first phase switch ($PS_1$ as shown in FIG. 1) conducts and the first LED group is turned on, while this level of voltage is not high enough to turn on the downstream LED groups, such as Group 2, Group 3, . . . and Group n as shown in FIG. 1. Note that PS1 can be turned on before, at, or after the voltage of the power source reaches a level enough to power Group 1. The same applies to PS2, PS3, . . . and PSn. As the voltage of the power source further increases, it reaches a level enough to power the first and the second LED groups (Group 1 and Group 2), $PS_2$ conducts and the first and second LED groups are turned on. PS2 can be turned on before, at, or after the voltage of the power source reaches a level enough to power Group 1 and Group 2. As the increase in voltage of the power source continues, eventually all phases or LED groups are turned on in a sequence from upstream to downstream the string of LED groups. As the source voltage increases, first phase voltage $V_1$ (FIG. 1) increases and first phase switch $PS_1$ dissipates more and more power. To reduce the power dissipation, $PS_1$ can be turned off when Group 2 is turned on. Alternatively, $PS_1$ can be turned off before Group 2 is turned on. Same analogy applies for subsequent groups. As the source voltage increases further, Groups 3, 4, . . . and n are gradually turned on. Generally speaking, when a downstream group is turned on and the phase switch associated with the downstream group conducts, the phase switches associated with the upstream groups can be turned off to reduce power consumption. The last phase switch or switches, PSn, can be turned off as well to reduce power dissipation or to protect the circuit from over-voltage as Vn continue to increase. Once the source voltage reaches its peak and descends, the above process reverses, where PSn turns back on first, Ps1 turns back on last. Note that as the source voltage decreases to a level insufficient to keep the downstream group on, the downstream group is naturally turned off even though its associated phase switch might be on. When the source voltage decreases from its peak to zero, group n turns off first and Group 1 turns off last.

Turning off PS1 before PS2 conducts will turn off group 1, that reduces the on time of group 1 and creates a dimming effect. Turning on PS1 after the voltage of the power source increases enough to power group 1 creates a similar dimming effect. Same analogy applies to the subsequent phases.

There are several ways to control the turning-on/off of each group (phase) and each phase switch.

a. By turning on all of the phase switches PSs at the beginning and monitoring the phase current i1, i2, . . . flowing into each phase switch. Even though the PSs are turned on, there will not be any current flowing until the source voltage has risen to a sufficient level. As the source voltage rises from zero voltage to a level sufficient to turn on Group 1, the phase current i1 flowing into PS1 would start to flow and eventually reaches a designed current limit. As the voltage of the power source further increases to a level sufficient to turn on both Group 1 and Group 2, the phase current i2 flowing into PS2 will start to flow. Feedback circuitry can be used to pinch off the phase current i1 in PS1 to a minimal level, or to turn off PS1 and completely stop i1, as phase current i2 in PS2 increases to a designed current limit. Depending on the feed back method, the phase current i1 in PS1 can be smoothly or abruptly switched over to i2 in PS2. This process is repeated in downstream groups. With the increase of the voltage of the power source, finally Group n is turned on. As the source voltage increases to its peak value and starts to decrease, the process reverses. The last phase switch PSn might dissipate a lot of power, depending on how long it stays in conduction.

An over-voltage protection circuit can be used to protect PSn as described later in this specification.

b. By turning on all of the PSs at the beginning and monitoring the phase voltage V1, V2, . . . , Vn. When the source voltage is sufficient to turn on Group 1, PS1 conducts and V1 starts to rise. When the source voltage is high enough to turn on Group 1 and Group 2, PS2 conducts and V2 starts to rise. PS1 can be turned off at this point. And so on. Finally, Vn starts to rise and PS(n−1) can be turned off. As Vn rises higher, PSn will start to dissipate more power. An over-voltage/over-power circuit is used to protect PSn as described elsewhere in the specification. As the source voltage increases to its peak value and starts to decrease, the process reverses.

c. By monitoring the rectified source voltage, Vrect, and turning on/off each phase switch PS at a fixed, pre-determined voltage level of Vrect. In this method, PS1 is turned on when Vrect has risen to a value pre-determined to be sufficient to turn on Group 1. PS2 is turned on when Vrect has risen to a value pre-determined to be sufficient to turn on Group 1 and Group 2. After turning on PS2, PS1 is turned off. And so on. Finally, after turning on PSn, PS1, PS2, . . . and PS(n−1) are turned off. Alternatively, all PSs can be turned on at the beginning, then PS1 is turned off when Vrect has risen to a value pre-determined to be sufficient to turn on Group 1 and Group 2. PS2 is turned off when Vrect has risen to a value pre-determined to be sufficient to turn on Group 1, 2, and 3. And so on. PSn can be protected from high power dissipation by an over-voltage/over-power protection circuitry. As the source voltage increases to its peak value and starts to decrease, the process reverses.

As mentioned before, the turn on/off instant of each phase can be altered for dimming purpose.

This multiphase driving scheme described above increases the conduction angle and reduces power dissipation. It allows operation with legacy dimmers and provides natural under-voltage protection where it only turns on the LED group(s) corresponding to the source voltage level When turning on each phase switch (PS), the phase current flowing through PS can be limited to a constant or near constant value, or a temperature dependent value, or a time dependent value. The adjustment in the current is used to compensate for the LED light output performance variation due to temperature variation and aging.

The circuit allows Power Factor Correction (PFC) when the total phase current (the sum of individual phase currents) is forced to follow the power source voltage waveform. PFC is achieved without using bulky component/circuitry.

Alternatively, the phase switch can be turned on as a simple resistor or a switch connected in series with a resistor. In this case, the phase current is limited by the total resistance in the conduction path.

The present invention also provides a new dimming method. According to the present invention, LEDs can be dimmed by adjusting the phase current limit level set in each phase switch (PS). The LEDs can also be dimmed by turning on each group late, by turning off each group early, or by turning one or more groups off. The LEDs within one group can be chosen to have different turning-on voltage, so that different LEDs in the group are turned on at different voltages, further providing dimming effect.

The present invention also provides an over-voltage/over-power protection circuitry. Over-voltage occurs when the power source voltage increases beyond its normal range. When this happens, the voltage Vn as shown in FIG. 1 increases by the same amount and results in high power dissipation in the corresponding phase switch PSn. When the total voltage drop across the LED group reduces, Vn increases by the same amount which also results in high power dissipation in PSn. When the number of needed LEDs for the application is small relative to the voltage of the power source, the excess voltage after all Groups are turned on also causes high power dissipation in PSn. To protect against these conditions, the following methods are proposed:

a. Constant light with high power dissipation in PSn. This method simply uses high power devices for PSn to handle the extra power dissipation. In this case, PSn is kept on until the voltage of the power source decreases to a value insufficient to keep PSn on. Since all of the LED groups are kept on throughout the over-voltage condition, the total light output are the same (or constant) as that during normal voltage condition.

b. Increasing light with redundant LED. Increase the number of LEDs in one or more groups and/or increase the number of groups so that during worst case over-voltage condition, Vn will not rise up too high. During normal operation, the last group(s) does not turn on. During over-voltage condition, this last group(s) turns on and gives additional light output.

c. Reducing light by turn off all phase switches during the portion of time in each voltage cycle where the supply voltage level is too high. By turning off the PSs, no power dissipation incurs but the amount of total light output reduces because the LED Groups are off during the over-voltage condition.

The present invention further provides over-temperature protection: Use temperature sensor(s) to detect over temperature condition and scale down the current limit or shut down the whole circuit completely.

Timer circuitry can be used. A simple voltage/current detector and a digital counter make use of the power source period as the fundamental clock. A clock is set whenever any PS switches on/off or when the power source voltage rises or falls. This clock is used to control various flashing patterns.

This multiphase driver circuit can be easily and cost effectively implemented in an Integrated Circuit.

The present invention has the following advantages:
1. Work directly off-line. No magnetic, no energy storage capacitor, no AC/DC converter is needed.
2. Allow Power Factor Correction if desired.
3. Work with legacy dimmers
4. Allow new multiple dimming capability
5. Under-voltage protection: Natural under-voltage protection by turning on only the corresponding phases that has enough power to turn on. The result is slight dimming when under-voltage condition occurs.
6. Three different method for Over-voltage protections: constant light with high power dissipation, increasing light with redundant LED, or reducing light with lowest power dissipation.
7. Over temperature protection.
8. Use the power source period as the fundamental clock for various timing and flashing patterns.
9. Cost efficient implementation in an Integrated Circuit.

Figure 3:
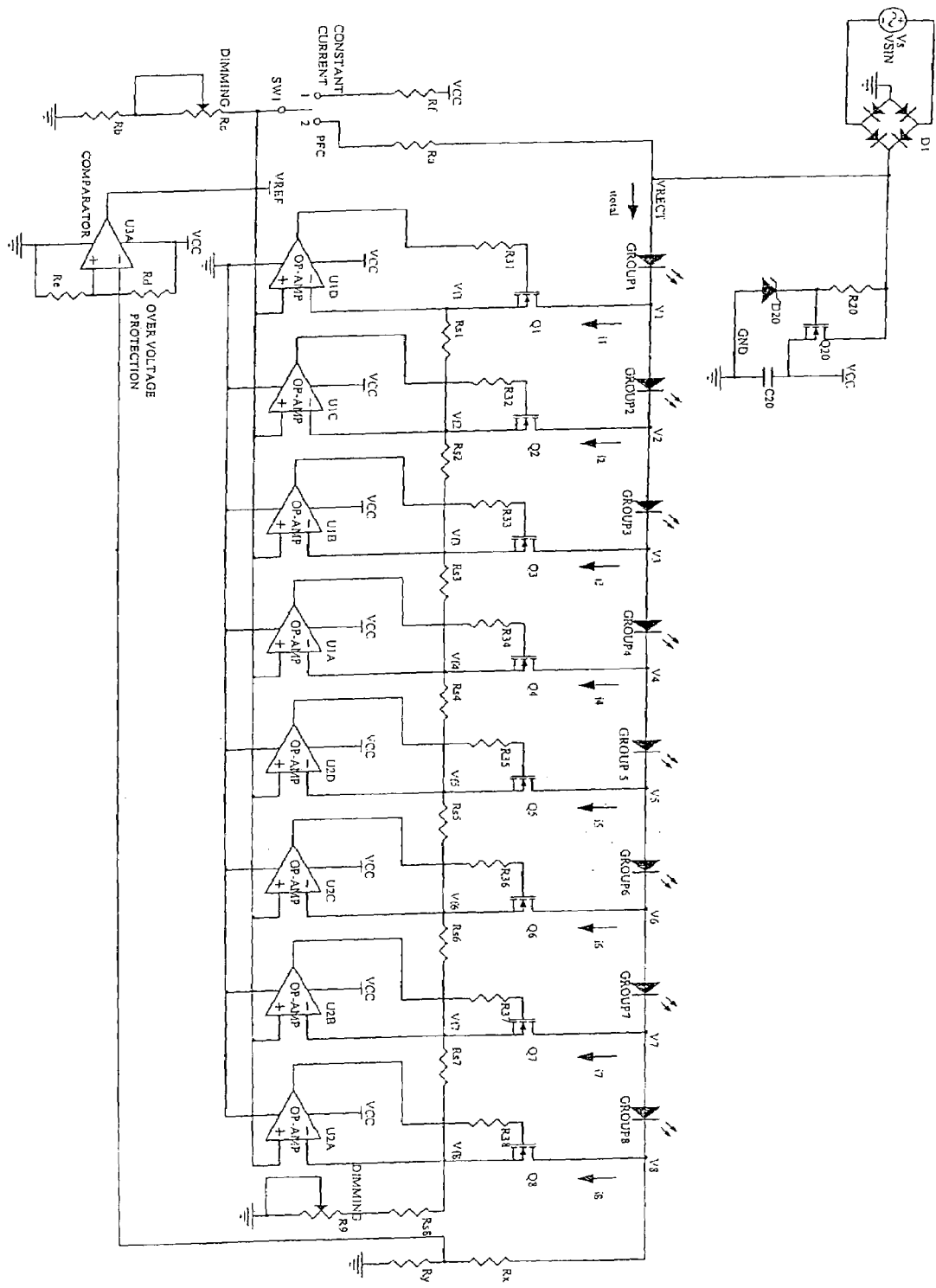
FIG. 3 illustrates an eight-phase LED driver circuit with active current control, dimming, optional PFC, and over-voltage protection. Over voltage is done by sensing the last phase voltage (V8).

Now referring to FIG. 3, one embodiment of the LED driver circuits of the present invention is illustrated in FIG. 3. This multiphase LED driver circuit uses active current limit. The LED driver circuit includes eight phases or LED groups (GROUP 1 through GROUP 8). Groups 1-8 are connected to Q1-Q8, respectively, where Q1-Q8 are transistors serving as phase switches.

Vs represents an AC power source. D1 represents a rectifier circuit which outputs a rectified voltage Vrect. Phase switch PS1 of group 1 comprises OP-AMP U1D, resistor R31, and transistor Q1; Phase switch PS2 of group 2 comprises OP-AMP U1C, resistor R32, and transistor Q2; Phase switches PS3 through PS8 comprise similar components. Rs1, Rs2, Rs3, Rs4, Rs5, Rs6, Rs7, Rs8, and R9 are current sensing resistors as part of a current feedback loop for the phase switches. R9 is a variable resistor used for dimming purpose. Another variable resistor Rc is also used to provide a different dimming alternative. When switch SW1 is switched to position 1, resistors Rf, Rc, Rb and switch SW1 set a constant DC reference voltage VREF to program a constant or near constant total DC current $i_{total}$ into the LED Groups. When switch SW1 is switched to position 2, resistors Ra, Rc, Rb and switch SW1 program the reference voltage VREF to an AC voltage following the shape of Vrect waveform, which in turn program the total current $i_{total}$ into the LED groups to follow the same waveform as the power source voltage waveform. Rx, Ry, and U3A form an over-voltage/over-power protection circuit. The circuit containing resistor R20, diode D20, transistor Q20 and capacitor C20 illustrates an example of a power source, VCC, derived from Vrect to power U1, U2, U3 and to create VREF.

Theory of operation (although the present invention is not limited to any theory): Set SW1 to position 1 for constant current mode where VREF is a constant DC voltage. Let Vrect starts at zero voltage 0V, none of the LED groups is on and there is no current flowing though the sensing resistors Rs1, Rs2, ..., Rs8 and R9. Op-Amp U1D drives the gate of Q1 high, Q1 is turned on and we can say that PS1 is on. However, there is no current flowing through Q1 since the rectified voltage Vrect is not sufficient to turn on group 1 yet. Similarly, PS2, PS3, ..., PS8 are also turned on but without any current flowing through them. As Vrect increases to a level sufficient to turn on group 1, phase current i1 starts to flow through Q1, and through the current sensing resistors Rs1, Rs2, ..., Rs8 and R9 to ground. Resistor R31 is added in series with Q1's gate to damp out possible high frequency oscillation. As Vrect increases, the phase current i1 increases and the voltage drop, Vf1, across the current sensing resistors Rs1-Rs8, R9 increases. As Vf1 increases to the reference voltage VREF value, the Op-Amp U1D regulates Q1 gate voltage to control i1 to a value so that Vf1 is equal or close to VREF. This control mechanism is known as control and feedback. Control and feedback theory are well known. Its theory and its various configurations are well documented in many text books and are widely used. How close Vf1 can be regulated to VREF and how fast for the control loop to do so depends on the control feedback method used and the limit of practical circuit components such as Op-Amp's gain bandwidth, input offset voltage, input bias current, etc. For simplicity, the embodiment of the invention does not describe all of the control and feedback variations and practical component limitations in the figures. Applying those control and feedback variation does not depart from the scope of this invention. The circuit in FIG. 3 can be optimized in many different ways depending on the application requirement, choice of components used, type of LED, etc. These optimizations do not depart from the spirit and scope of this invention.

As Vrect continues to increase, i1 is regulated to:

i1=VREF/(Rs1+Rs2+ ... +Rs8+R9), assuming all components are ideal.

When Vrect increases to a level sufficient to turn on group 1 and group 2, phase current i2 starts to flow through Q2, Rs2, Rs3, ..., Rs8 and R9 to ground and causes the voltage drop, Vf2, across the current sensing resistors Rs2-Rs8, R9 to rise. Similar to the above, U1C controls Q2 so that Vf2 is equal or close to VREF. As i2 flows through the current sensing resistors, it contributes to the rise of Vf1 and automatically pinches down i1. When i2 rises to a level that causes Vf2 to be equal or close to VREF, i1 would be pinched down to a minimal value close to zero and PS1 is practically off. The following equation describes the interaction between phase current i1 and i2 while Vrect is sufficient to turn on group 1 and group 2 but not enough to turn on the subsequent groups:

Vf1=i1·Rs1+Vf2

Vf2=(i1+i2)·(Rs2+Rs3+ ... +Rs8+R9)

U1D and U1C control feedback loop substantially forcing Vf1=Vf2=VREF. To satisfy the above equations, i1 must be very small and the regulated value for phase current i2 is approximately:

i2=VREF/(Rs2+Rs3+ ... +Rs8+R9)

In practical circuit Rs1 is used to compensate for Op-Amp's input offset voltage and other non-ideal parameters. The larger Rs1, the smaller i1 is when PS2 is on. It should be noted that the regulated value of i2 is higher than that of i1. The different is minimal when Rs1 is small relative to the sum of (Rs2+Rs3+ ... +Rs8+R9). The total input current, $i_{total}$, increases from regulated value of i1 to regulated value of i2 during this interval. To keep this increase step small, make Rs1 small compared to the sum of (Rs2+Rs3+ ... +Rs8+R9).

As Vrect voltage increases to a value sufficient to turn on group 1, group 2, and group 3, phase current i3 starts to flow thorough phase switch Q3 and pinches down i2 in a similar manner. Same analogy applies to the rest of the phase switches. In this arrangement, the phase current of one phase or group is smoothly switched over to the next phase or group. Each successive phase current is a step larger than the previous one. Rs1, Rs2, ..., Rs7 is kept relatively small compared to (Rs8+R9) to give a relatively small step different in the phase currents i.e., regulated i1, i2, ... i8.

When the last phase switch PS8 is on and phase current i8 reaches its regulated limit, phase voltage V8 increases as Vrect continues to increase. When V8 rises to a threshold value, U3A senses this voltage via Rx and Ry and pulls down VREF, effectively turns off all phase switches PSs and protects PS8 from an over-voltage/over-power condition. U3A keeps VREF down until V8 (driven by Vrect) has dropped to an acceptable level.

The current limit in each phase switch is a function of the current sensing resistors and VREF. By changing the sensing resistor value, the regulated phase current limits in the phase switches are adjusted. This can be used to create a dimming effect. R9 illustrates such implementation. Alternatively, changing VREF also create a similar dimming effect. Rc illustrates such implementation.

When SW1 is set to position 2, VREF is now an AC voltage waveform with the same shape as of Vrect. This VREF together with the feedback loop forces the total current $i_{total}$ to follow the input voltage waveform, thus achieving Power Factor Correction.

Figure 4:
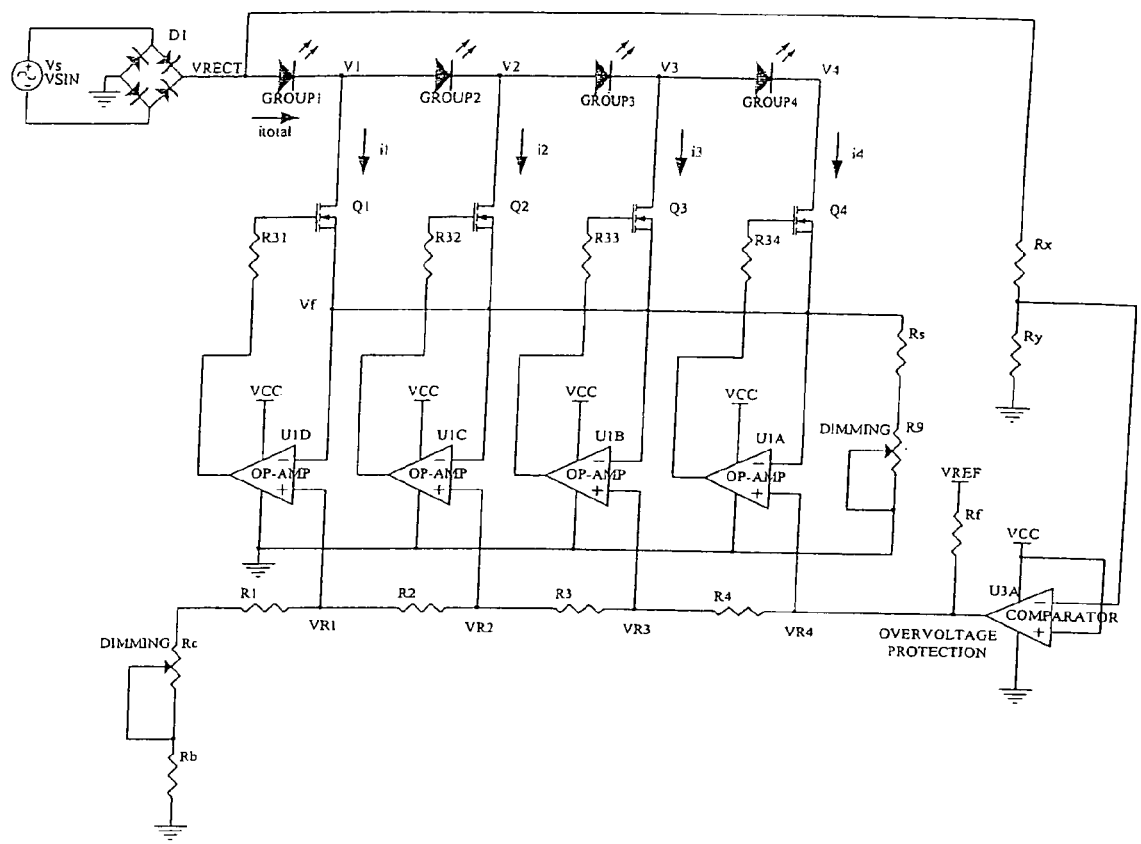
FIG. 4 illustrates a four-phase LED driver circuit with active current control, dimming, and over-voltage protection. Phase switching is done by stacking the reference voltage. Over voltage is done by sensing the input voltage (Vrect).

FIG. 4 shows a circuit similar to the circuit in FIG. 3, but only has four phases. The VCC and VREF example circuits are left out and herewith denoted by their symbols VCC and VREF. The feedback circuitry is re-arranged to have one common current sensing resistor (Rs+R9). Reference voltage VREF is divided down to voltage VR1, VR2, VR3 and VR4 to compensate for the Op-Amp offset voltage and other non-ideal parameters. The resulting operation is similar to that of FIG. 3. The following equations describe the basic operation of the circuit:

VR1=VREF(Rc+Rb+R1)/(Rc+Rb+R1+R2+R3+R4+Rf)

VR2=VREF(Rc+Rb+R1+R2)/(Rc+Rb+R1+R2+R3+R4+Rf)

VR3=VREF(Rc+Rb+R1+R2+R3)/(Rc+Rb+R1+R2+R3+R4+Rf)

VR4=VREF(Rc+Rb+R1+R2+R3+R4)/(Rc+Rb+R1+R2+R3+R4+Rf)

Vf=(i1+i2+i3+i4)·(Rs+R9)

During the interval of Vrect when only group 1 and group 2 are on, Vf=(i1+i2)·(Rs+R9). U1C forces Vf=VR2 which is higher than VR1 and U1D turns off Q1, pinches off i1. As Vrect increases sufficiently to turn on group 1, group 2 and group 3, U1B forces Vf=VR3 which is higher than VR2. U1C turns off Q2 in a similar manner. Same analogy applies when group 4 turns on. The differences in VRs are to compensate for Op-Amp input bias voltage and other non-ideal parameters. These differences also contribute to the difference in the regulated phase current value in each phase switch PS, resulting an increase in total current $i_{total}$ when each successive phase switch is turned on. The following equations described the regulated phase current value in each phase switch while they are conducting. Assuming all ideal components.

i1=VR1/(Rs+R9)
i2=VR2/(Rs+R9)
i3=VR3/(Rs+R9)
i4=VR4/(Rs+R9)

The over-voltage/over-power protection circuit containing Rx, Ry and U3A monitors Vrect and pulls down all VRs, which effectively turns off all phase switches when Vrect are higher than a preset threshold. VCC is conveniently used as the reference for this over-voltage threshold.

Figure 5:
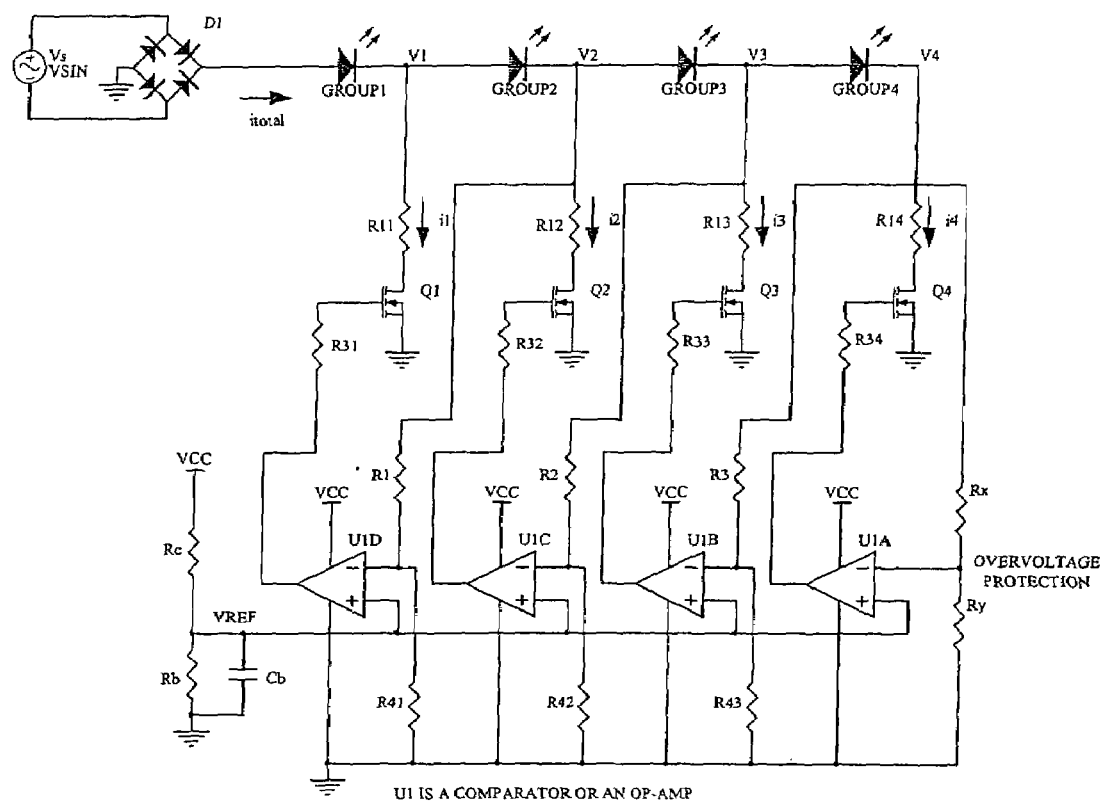
FIG. 5 illustrates a four-phase LED driver circuit with passive current control, dimming, and over-voltage protection. Phase switching is done by sensing the downstream phase voltages. Over voltage is done by sensing the last phase voltage (V4).

FIG. 5 shows a circuit which implements passive current limit where the phase current is limited by resistor(s) in series connection with the phase switches in the conduction path. Phase switch PS1 of group 1 comprises resistor R11, transistor Q1, resistor R31, and OP-AMP U1D. Phase switches PS2, PS3 and PS4 comprise similar components in the same arrangement. Rc and Rb set a reference voltage VREF. Capacitor Cb solely serves as a bypass capacitor. Initially, U1D drives Q1 on, but phase current i1 is not flowing until Vrect rises to a sufficient level to turn on group 1. As Vrect rises higher, i1 increases but is limited by the following equation:

V1=(Vrect−Vgroup1) and i1=V1/(R11+Rds(on)Q1);

Where Vgroup1 is the voltage drop across group 1 and Rds(on)Q1 is the on resistance of Q1 when it is on.

When Vrect rises to the next level where both group 1 and Group 2 are on, U1D senses this condition by monitoring V2 via R1 and R41 and turns off Q1. The quantity (R11+Rds(on)Q1) is chosen accordingly to limit i1 to an appropriately level until Q1 is turned off. When Vrect rises sufficiently to turn on group 1, group 2, and group 3, U1C senses this condition by monitoring V3 and turns off Q2. Same analogy applies to the next phase where V4 triggers U1B to turn off Q3. As Vrect continues to increase, V4 continues to increase. When V4 increases to a threshold value, U1A senses this over-voltage/over-power condition via Rx and Ry, and turns off Q4. The scenario reverses when Vrect reaches its peak and descends.

Figure 6:
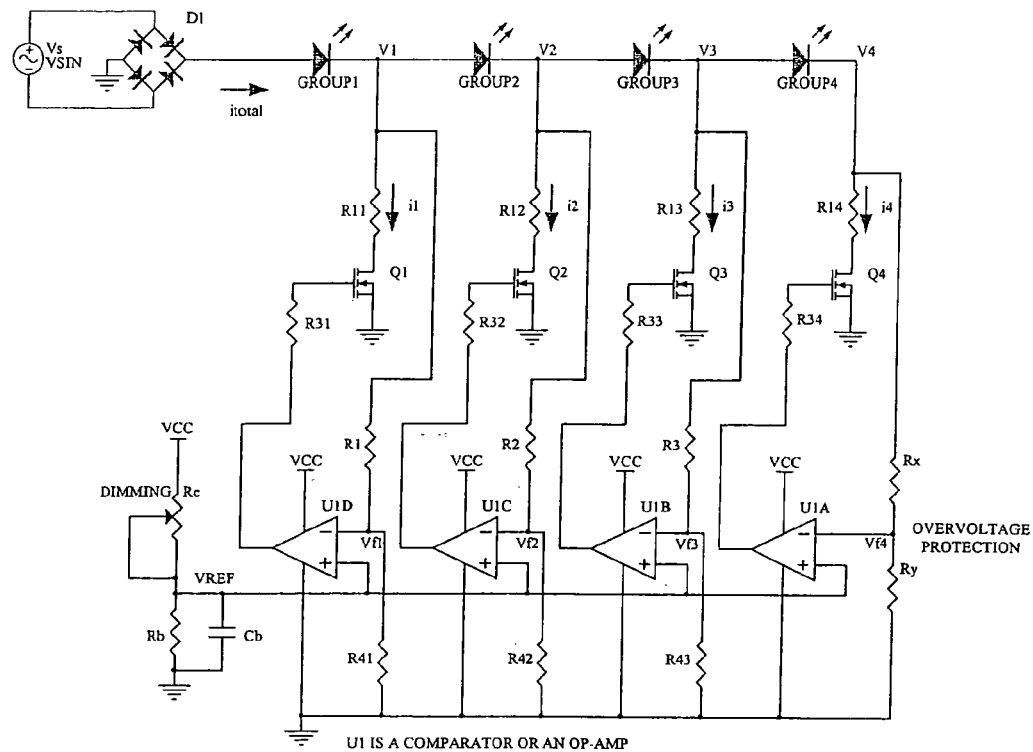
FIG. 6 illustrates a four-phase LED driver circuit with passive current control, dimming, and over-voltage protection. Phase switching is done by sensing each phase's own voltage. Over voltage is done by sensing the last phase voltage (V4).

FIG. 6 shows a circuit which is almost the same as that in FIG. 5, but the turning-off action of each phase switch is determined by its own phase voltage level rather than by the downstream phase voltage. U1D senses phase voltage V1 of group 1 via R1 and R41 and turns off Q1 when this phase voltage level exceeds the threshold set by VREF. Adjusting VREF allows Q1 turns off at different time, this effectively changes Q1 conduction time and produces a dimming effect. Similar circuit operation applies for the subsequence phases.

Note that each PS in this circuit monitors its own phase voltage to determine when to turn itself off while each PS in the circuit in FIG. 5 monitors the down stream phase voltage to turn itself off. It is possible for the PS to monitors both its own phase voltage and the down stream phase voltage to determine the best turn off moment. Such variation is included in this embodiment.

Figure 7:
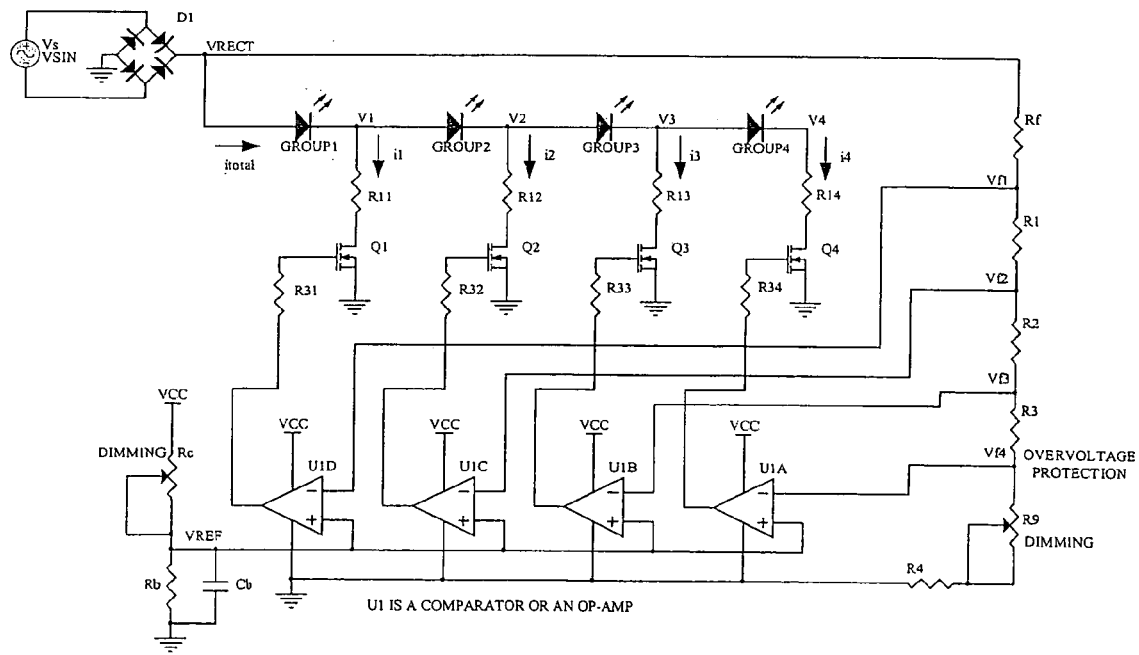
FIG. 7 illustrates a four-phase LED driver circuit similar to the circuit in FIG. 6, but phase switching and over-voltage is done by sensing Vrect.

FIG. 7 shows a circuit similar to the circuit in FIG. 5 and FIG. 6, but the turning off of each phase switch is determined directly by the voltage level on Vrect. Rf, R1, R2, R3, R4, and R9 form a resistive divider from Vrect to create Vf1, Vf2, Vf3 and Vf4, which are proportional to Vrect. As Vrect increases to a level corresponding to Vf1≧VREF, U1D turns off Q1. Similarly, as Vrect increases further, Vf2 becomes equal to or larger than VREF and U1C turns off Q2. Same analogy applies to the subsequent phases. By changing VREF and/or R9, the phase switches are turned off at different time, creating a dimming effect. Over-voltage protection is inherent in this circuit since Q4 is always turned off after Vrect reaches a certain level corresponding to Vf4≧VREF.

Figure 8:
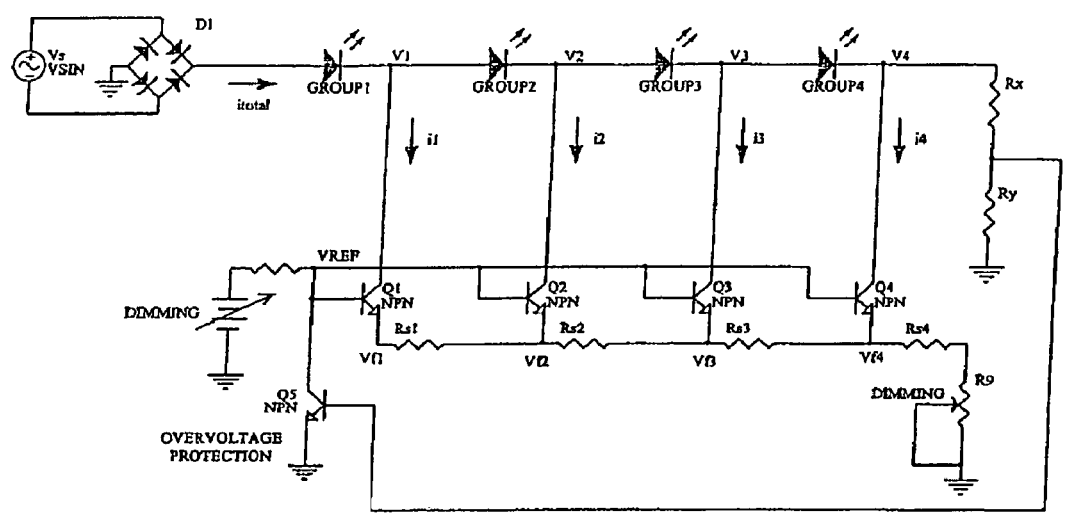
FIG. 8 illustrates a four-phase LED driver circuit with active current control, dimming, and over-voltage protection. Phase switching is done by stacking the phase current. Over voltage is done by sensing the last phase voltage (V4).

FIG. 8 shows a circuit using the same principle of the circuit in FIG. 3, but the Op-Amp function is designed using NPN bipolar transistors (Q). Q1 serves as phase switch PS1, Q2 serves as PS2, . . . , Q4 serves as PS4. Rs1, Rs2, . . . , Rs4 and R9 are current sensing resistors. Rx, Ry and Q5 form an over-voltage/over-power protection circuit. The control feedback operation operate as follow:

During the Vrect interval when only Group 1 is on:
i1=(VREF−Vbe1)/(Rs1+Rs2+Rs3+Rs4+R9); where Vbe1 is the base emitter voltage of Q1.

During the Vrect interval when group 1 and group 2 are on:
VREF=Vbe1+i1·Rs1+Vf2
VREF=Vbe2+Vf2; where Vbe2 is the base-emitter voltage of Q2.

Equate the two equations and solve for i1:
i1=(Vbe2−Vbe1)/Rs1

Since Vbe1 and Vbe2 are approximately the same, i1 is pinches off when i2 rises to its regulation value. The following equation calculates i2, neglecting the base currents in the transistors.
VREF=Vbe2+(i1+i2)·(Rs2+Rs3+Rs4+R9)

Substitute i1 with the previous equation and solve for i2:
i2=(VREF−Vbe2)/(Rs2+Rs3+Rs4+R9)−(Vbe2−Vbe1)/Rs1

Rs1 is needed to compensate for the difference between Vbe1 and Vbe2 for the purpose of keeping i1 very small while i2 is conducting.

During the next Vrect interval where group 1, group 2 and group 3 are on, similar result is obtained:
i3=(VREF−Vbe3)/(Rs3+Rs4+R9)−(Vbe3−Vbe2)/Rs2

Same analogy applies when all four Groups are on:
i4=(VREF−Vbe4)/(Rs4+R9)−(Vbe4−Vbe3)/Rs3

For simplicity, the calculation for i1, i2, i3, and i4 above neglect the base currents in the transistors. The base currents can be added into the calculation for a more accurate analysis without departing from the merit of the circuit.

Rs1, Rs2, and Rs3 are to compensate for the differences in Vbe in order to minimize the previous phase current when next phase conducts. These resistors introduce an increase of the current limit of the subsequent phase compared to the previous one. Keep these resistors value small relative to the sum of (Rs4+R9) to minimize this increase in current (so that the total current is relatively constant). Varying the current sensing resistor changes the set current limit and produces a dimming effect. R9 illustrates such implementation. Changing VREF also creates similar dimming effect.

Q5 monitors V4 via Rx and Ry. When V4 reaches a set threshold, Q5 pulls down reference voltage VREF and, thus, turns off all NPN bipolar transistors Q, protecting Q4 from high power dissipation.

To provide Power Factor Correction, change VREF to an AC voltage following the shape of Vrect (e.g. the one used in FIG. 3).

Figure 9:
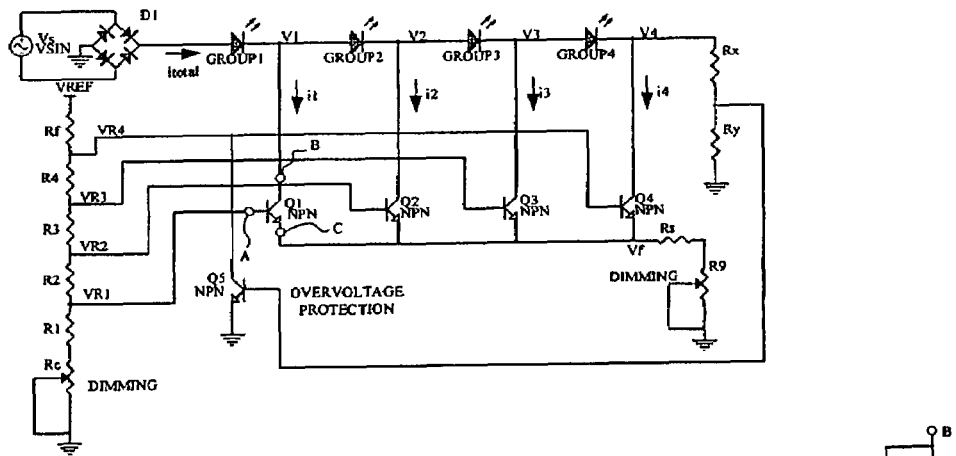
FIG. 9 is similar to FIG. 8 but phase switching is done by stacking the reference voltage.
Figure 9:
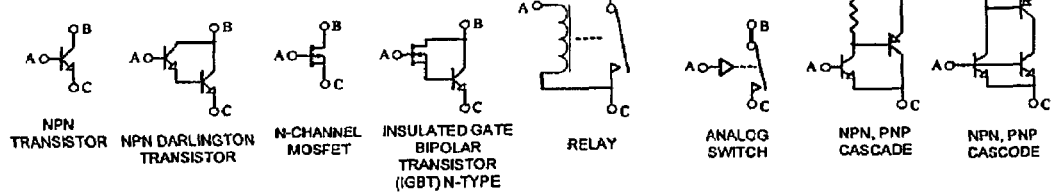

FIG. 9 shows a circuit similar to the circuit in FIG. 8, but it uses the feed back arrangement similar to the circuit in FIG. 4. This circuit uses one common current sensing resistor (Rs+R9) for all phases. It uses different reference voltage for each phase to compensate for the Vbe differences. R1, R2, R3, R4, Rf, and Rc form an exemplary circuit to create these reference voltages VR1, VR2, VR3 and VR4 where VR4>VR3>VR2>VR1. Since there are many different ways to create voltage references, the current embodiment does not show all of these variations. Such variations do not deviate from the merit of the present invention.

Figure 9A:
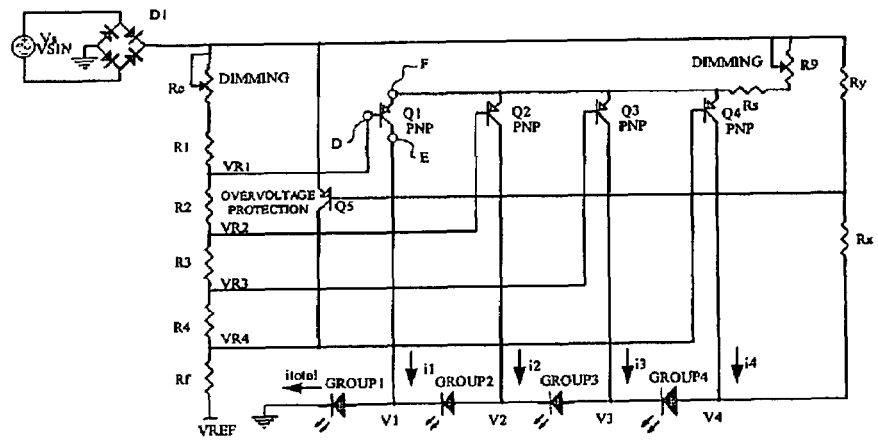
FIG. 9a shows a circuit equivalent to the circuit shown in FIG. 9, but using PNP type transistor, instead of NPN transistor.
Figure 9A:
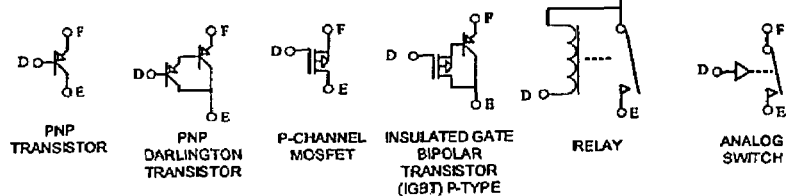

FIG. 9a shows a circuit equivalent to the circuit shown in FIG. 9, but using PNP type transistor, instead of NPN transistor. The circuit shown in FIG. 9a can be derived from that shown in FIG. 9 according to the well known NPN/PNP duality.

Figure 10:
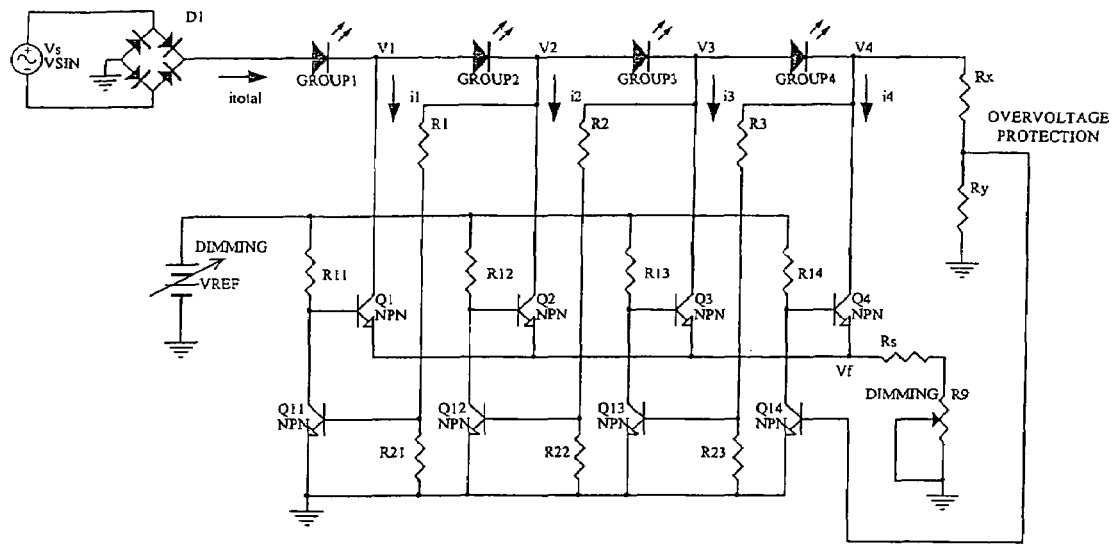
FIG. 10 illustrates a four-phase LED driver circuit with active current control, dimming, and over-voltage protection. Phase switching is done by sensing the downstream phase voltages. Over voltage is done by sensing the last phase voltage (V4). This circuit uses NPN transistors.

FIG. 10 shows a circuit which combines the principles of the circuits in FIG. 8 and FIG. 5. The circuit regulates the current in each phase using one common current sensing resistor chain (Rs+R9) and turns off the upstream phase by sensing the phase voltage on the down stream phases. Phase switch PS1 comprises Q1, Q11, R1, R11, and R21. PS2 and PS3 comprise similar components in the same arrangement. PS4 comprises Q4, Q14, R14, Rx, and Ry. PS4 includes an over-voltage/over-power protection circuit comprising Rx, Ry, and Q14.

When group 1 is on, phase current i1 is limited to:
i1=(VREF−Vbe1−ib1·R11)/(Rs+R9); Where Vbe1 is the base-emitter voltage of Q1 and ib1 is the base current of Q1.

When group 2 is on, i2 is limited to a similar equation:
i2=(VREF−Vbe2−ib2·R12)/(Rs+R9)

Q11 senses that group 1 is on by monitoring phase voltage V2 via R1 and R21 and turns off Q1. Note that while both Q1 and Q2 are conducting, the total current $i_{total}$ will be limited to the larger one of the two currents.

Same analogy applies when the subsequent groups turn on. After Q4 turns on while Vrect is still increasing, Q14 senses this over-voltage/over-power condition by monitoring phase voltage V4 via Rx and Ry and turns off Q4.

Varying R9 changes the current limit and creates a dimming effect. Varying VREF produces similar result. Applying a VREF with an AC waveform following Vrect waveform produces Power Factor Correction.

Each phase switch can sense its own phase voltage to determine when to turn itself off. This technique is not shown on the schematic, but is applicable. Applying such technique does not deviate from the principle of this embodiment.

Figure 11:
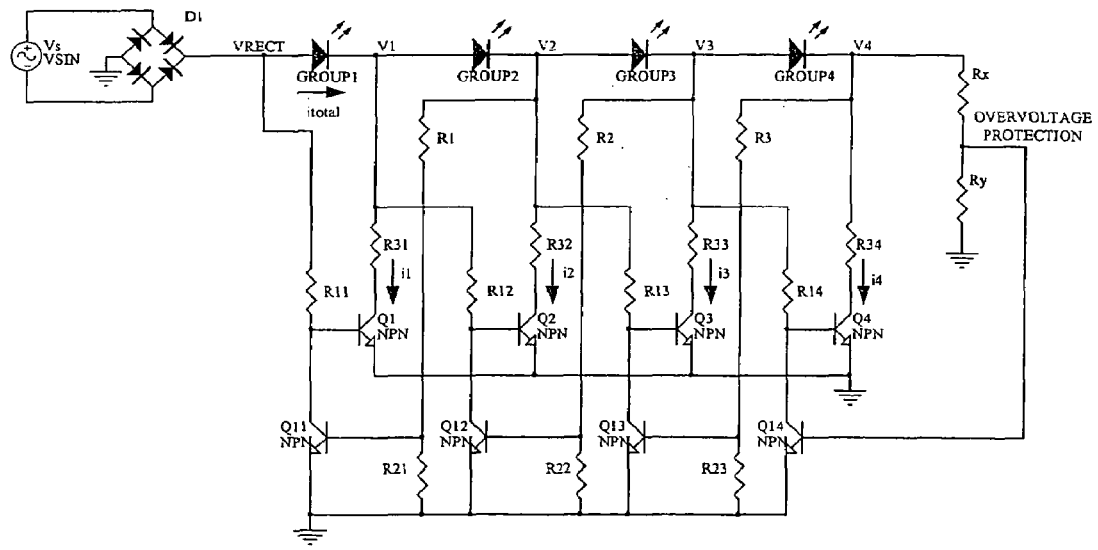
FIG. 11 illustrates a four-phase LED driver circuit with passive current control and over-voltage protection. Phase switching is done by sensing each phase's own voltage. Over voltage is done by sensing the last phase voltage (V4). This circuit uses NPN transistors.

FIG. 11 shows a circuit which uses similar architecture of the one in FIG. 10, but without active current limit. The circuit uses resistors to limit the phase current in each phase. Phase switch PS1 comprises transistor Q1, Q11, R1, R11, R21, and R31, wherein resistor R31 is connected to transistor Q1 in the conductive path of phase current i1. PS2 and PS3 comprise similar components set in the same arrangement. PS4 comprises similar components, but additionally includes an over-voltage protection circuit comprising Rx and Ry.

When group 1 turns on, phase current i1 is limited by:
i1=(Vrect−Vgroup1−VCEsat1)/R31; Where Vgroup1 is the voltage drop across group 1 and VCEsat1 is the collector-emitter saturation voltage of Q1.

When group 2 also turns on, Q11 senses that condition via R1 and R21 and turns off Q1. Phase current i2 is limited by a similar equation:
i2=(Vrect−Vgroup1−Vgroup2−VCEsat2)/R32; Where Vgroup2 is the voltage drop across group 2 and VCEsat2 is the collector-emitter saturation voltage of Q2.

Same analogy applies when the subsequent groups turn on. Q14 monitors V4 via Rx and Ry and turns off Q4 to protect Q4 from an over-voltage/over-power condition. Vrect continues to increase to its peak voltage and descend and the scenario reverses.

Figure 12:
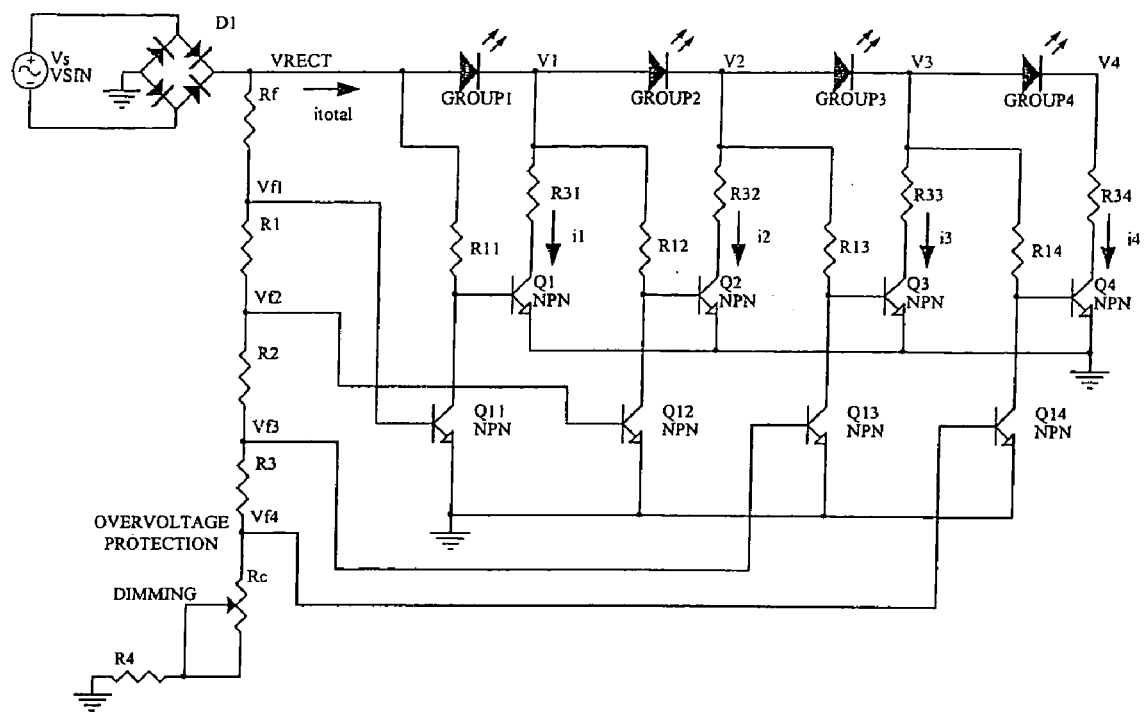
FIG. 12 illustrates a four-phase LED driver circuit with passive current control and over-voltage protection. Phase switching is done by sensing the rectified voltage, VRECT. Over voltage is done by also sensing VRECT. This circuit uses NPN transistors.

FIG. 12 shows a circuit similar to the circuit in FIG. 11, but it senses directly the rectified voltage Vrect to determine when to turn off each phase switch PS. Rf, R1, R2, R3, R4, and Rc form a resistive divider, creating reference voltages Vf1, Vf2, ..., Vf4 proportional to Vrect. These voltages are fed into Q11, Q12, ..., Q14 which turn off Q1, Q2, ..., Q4, respectively, at a predetermined threshold. Varying Rc shifts the reference voltages up and down which varies the turning off level of the phase switch, effectively produces a dimming effect.

Figure 13:
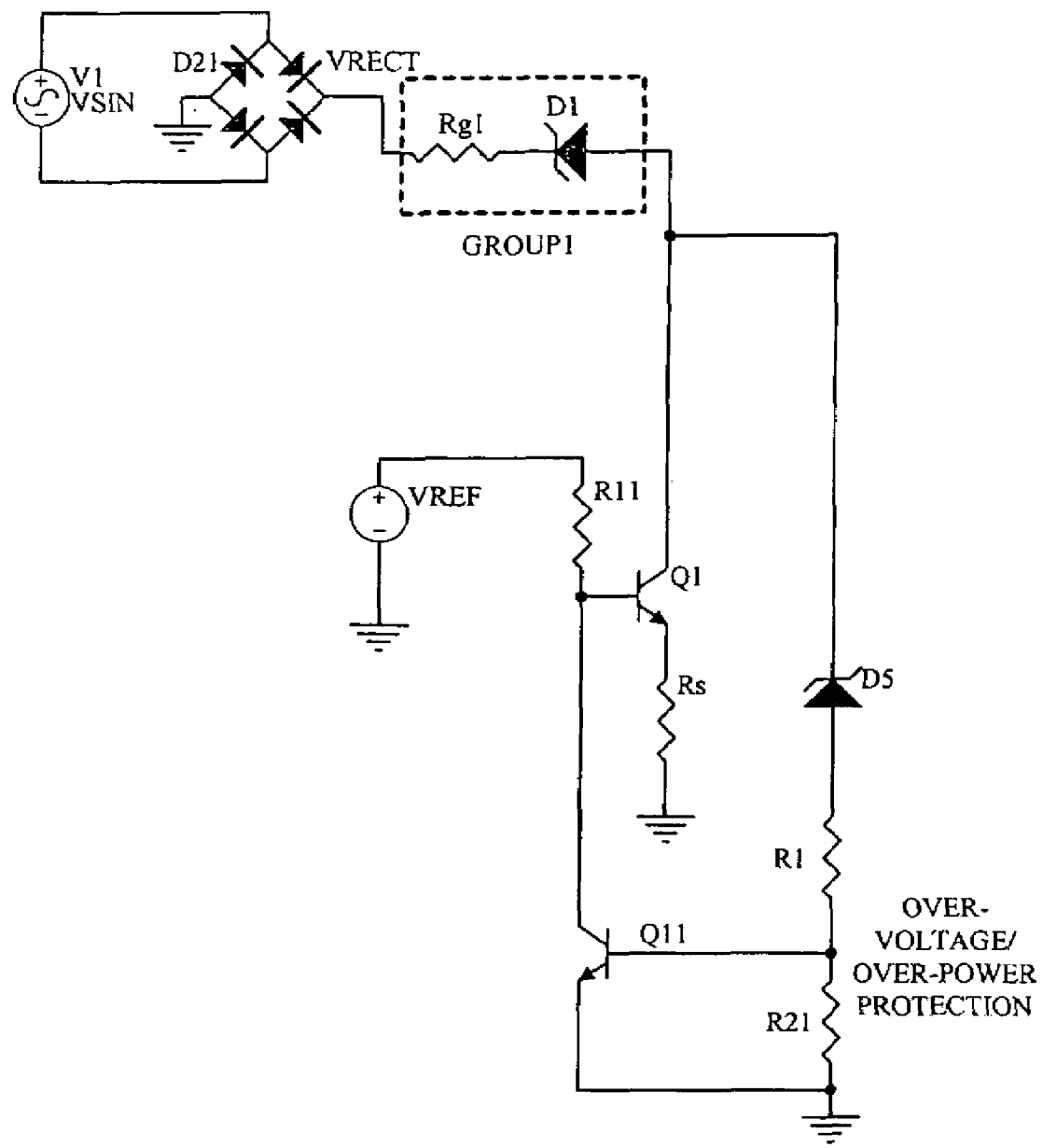
FIG. 13 illustrates a circuit with only one group of LED.

FIG. 13 shows a circuit illustrating an application example where only a small amount of light is needed; Resistor Rg1 and D1 represent the LED group. The circuit contains a single phase. The number of the LEDs in the group can be as low as one. Transistor Q1 turns on briefly at the beginning and at the end of each half cycle of the rectified power source. Reference voltage VREF, resistors R11 and Rs regulate the current flowing through Q1 when it is on. Transistor Q11, diode D5, resistors R1, and R21 form the over-voltage/over-power protection circuit which turns off Q1 when rectified voltage Vrect rises above a threshold that causes high power dissipation in Q1.

Figure 14:
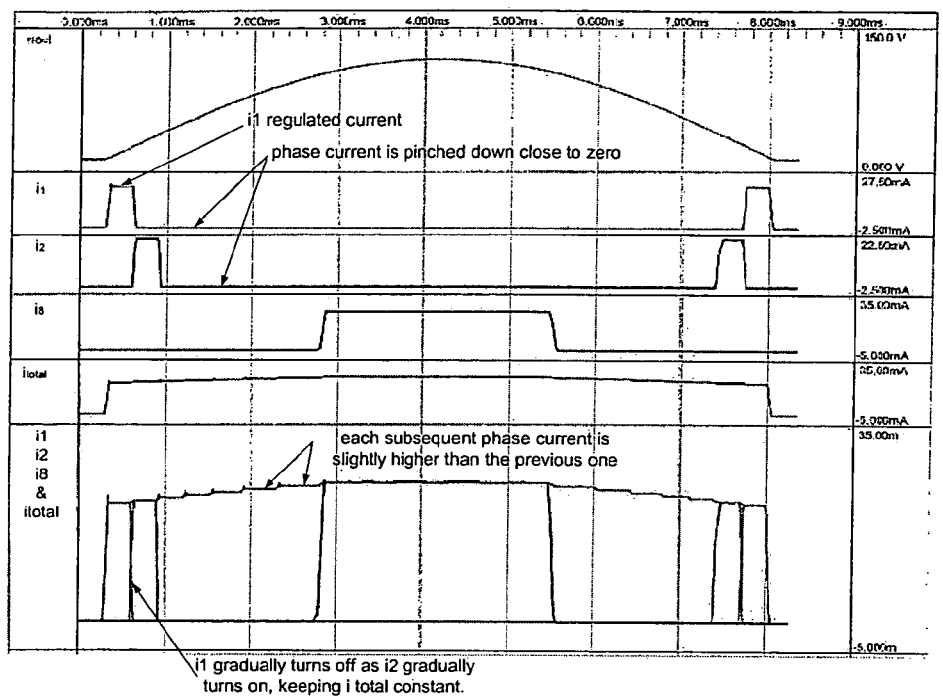
FIG. 14 illustrates simulation result of the circuit shown in FIG. 3 with switch SW1 set to position 1 (constant current limit mode).

FIG. 14 illustrates simulation result of the circuit in FIG. 3 with switch SW1 set to position 1 (constant current limit mode). The top trace shows one half cycle of the rectified power source (Vrect). Phase current i1 turns on first, follows by i2, i3, ..., and so on. As i2 starts to turn on, i1 gradually turns off so that the total current $i_{total}$ is kept substantially constant and smooth. As i2 turns on to its regulated value, i1 is pinched down to a low level close to zero. This low current level of i1 is designed so that the power dissipation in the phase switch PS1 is either insignificant or tolerable by the application. How close this low level current get to zero depending on the choices of components and control feedback technique. This figure also illustrates the fact that each successive phase current is slightly higher than the upstream one.

Figure 15:
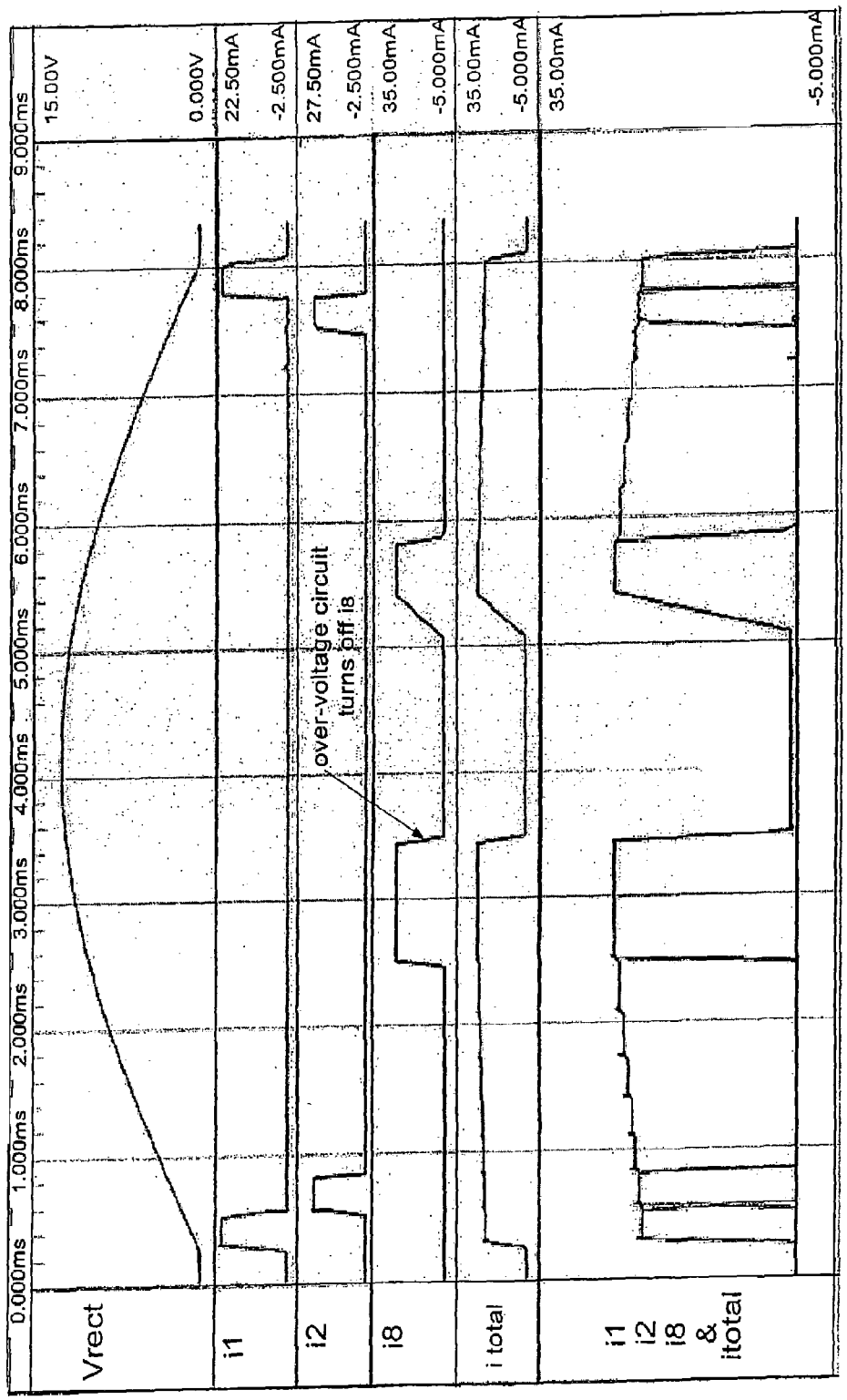
FIG. 15 illustrates the simulation result of the same circuit shown in FIG. 14 but with the over-voltage/over-power circuitry activated.

FIG. 15 is the simulation result of the same circuit in FIG. 14 but with the over-voltage/over-power circuitry activated. When Vrect reaches a threshold, all currents are turned off. During this off time, there is no power dissipation in the phase switches nor the LED groups.

Figure 16:
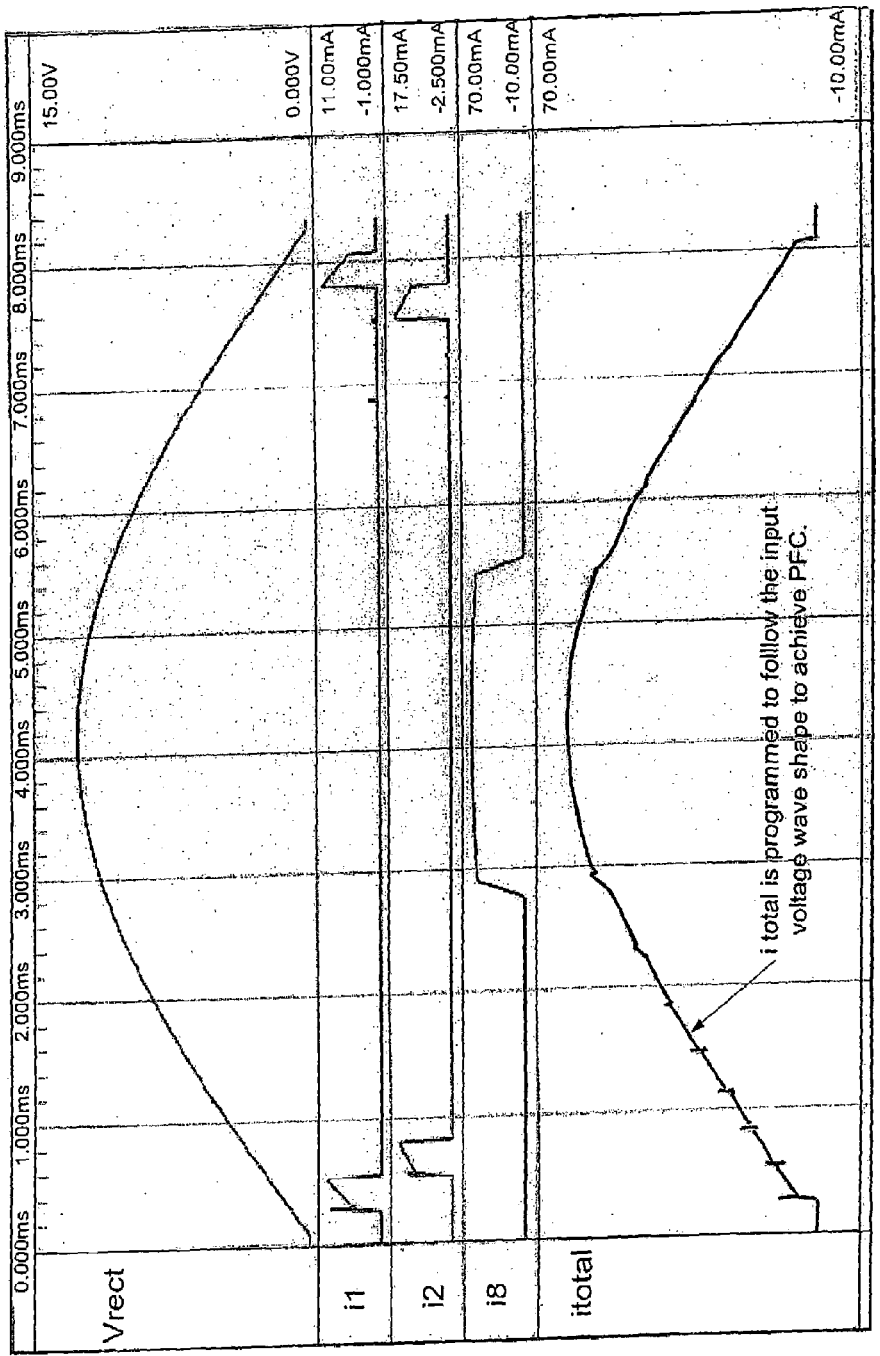
FIG. 16 illustrates the simulation result of the circuit shown in FIG. 3 with SW1 set to position 2 (PFC mode).

FIG. 16 is the simulation of the same circuit in FIG. 14 but with SW1 set to position 2 which programs VREF to an AC voltage that has the same wave shape as the power source wave shape. The figure illustrates the circuit result where the total current ($i_{total}$) is Power Factor Corrected.

Figure 17:
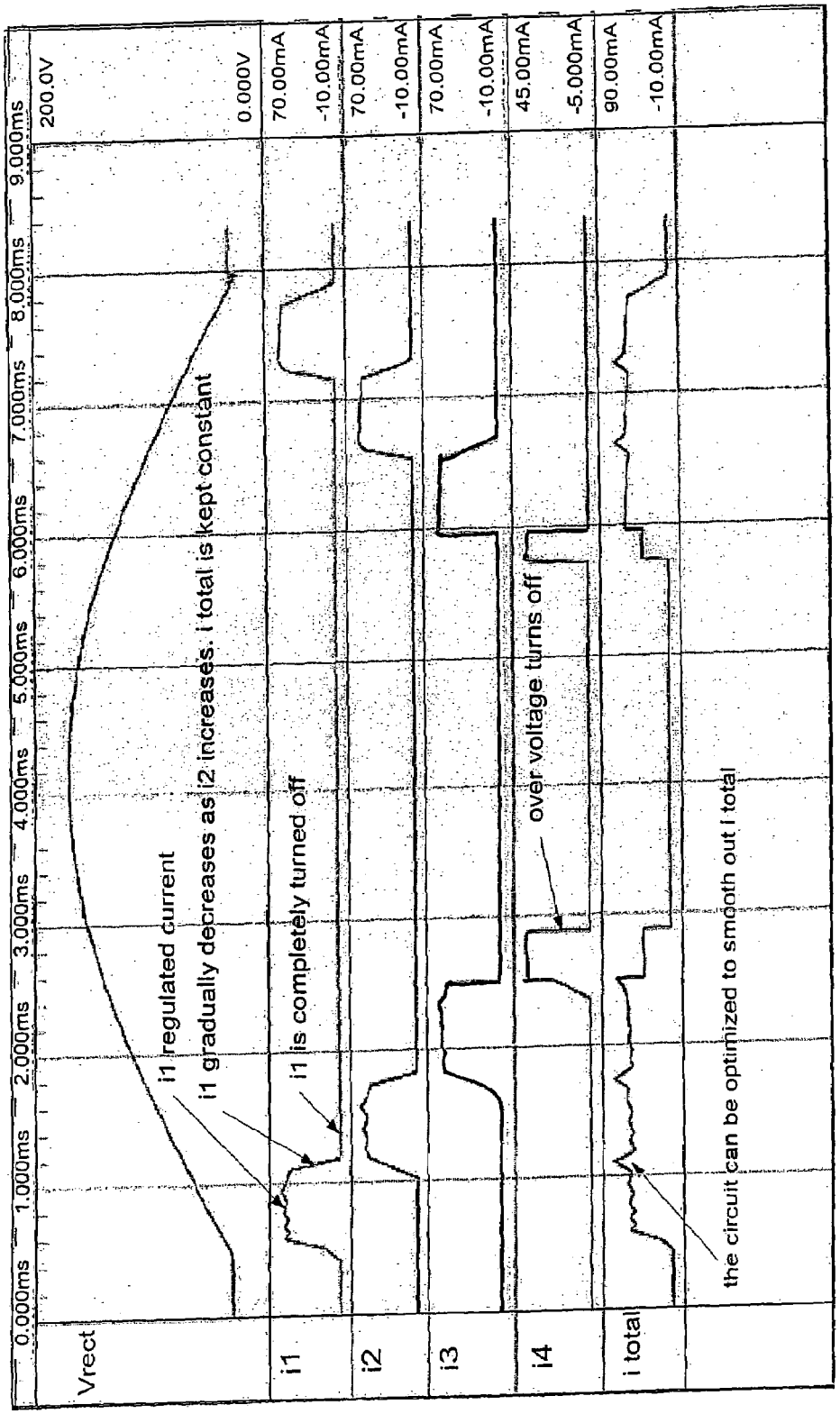
FIG. 17 illustrates the simulation result of the circuit shown in FIG. 10.

FIG. 17 is the simulation result of the circuit in FIG. 10. The result is similar to that of FIG. 14 where a downstream phase current smoothly takes over the upstream current. The different from FIG. 14 is that each upstream current is completely turned off after the corresponding downstream current reaches its regulated value. Another different is that the regulated current value of each phase switch is the same (give and take practical component tolerances).

Note that the total current ($i_{total}$) is not very smooth at the transition edges. This result can be improved by optimizing the design.

When Vrect reaches a threshold, the over-voltage/over-power protection circuit turns off all of the phase currents.

Figure 18:
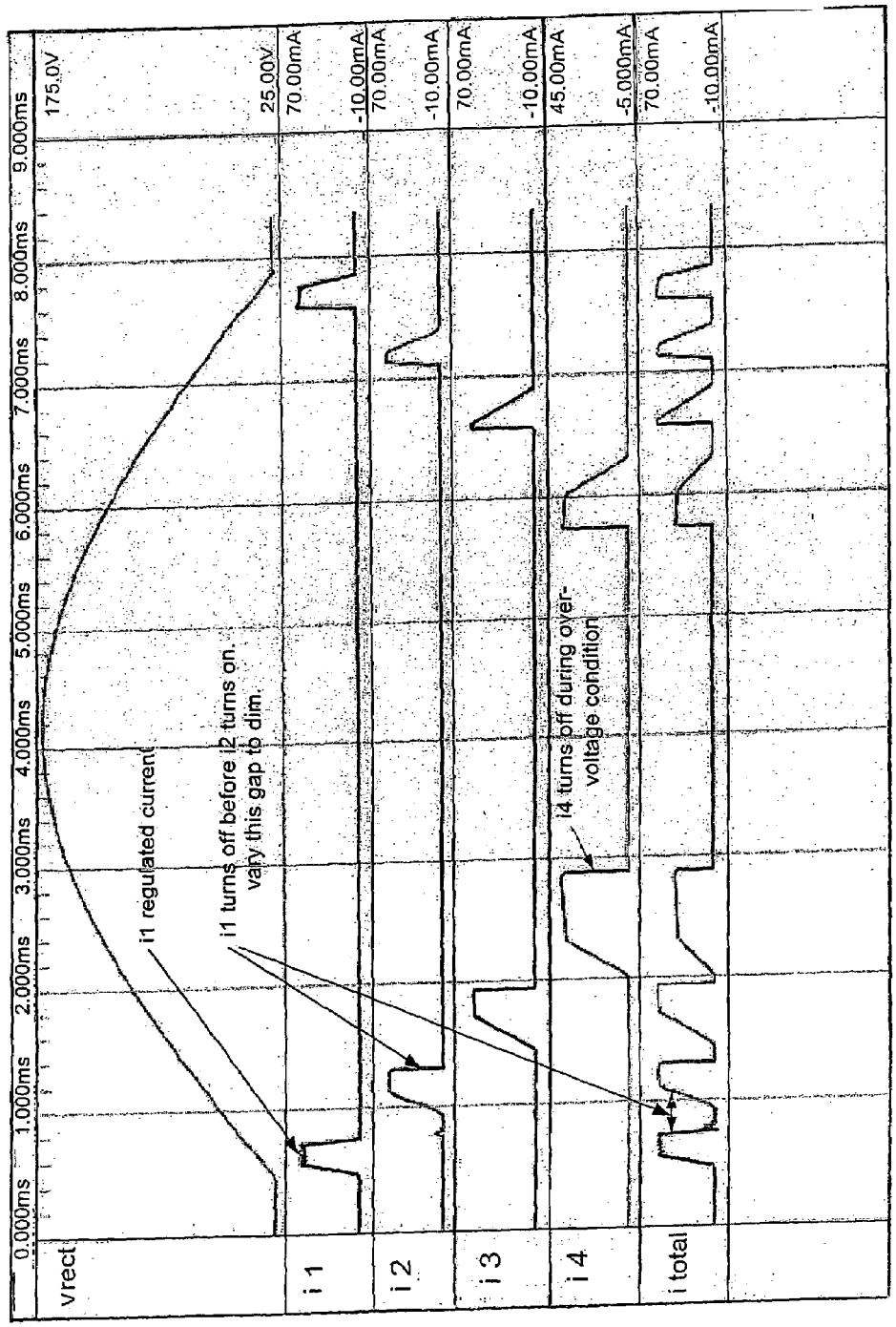
FIG. 18 illustrates the simulation result of a circuit similar to that of FIG. 10, but the turning off instance is determined by monitoring each phase's own voltage and compared with a reference level.

FIG. 18 is the simulation result of a circuit similar to FIG. 10 but the turning off instance is determined by monitoring each phase's own voltage and compared with a reference level. Changing the reference level allows an upstream phase to turn off before the corresponding downstream phase turns on, which results in a dimming effect.

Figure 19:
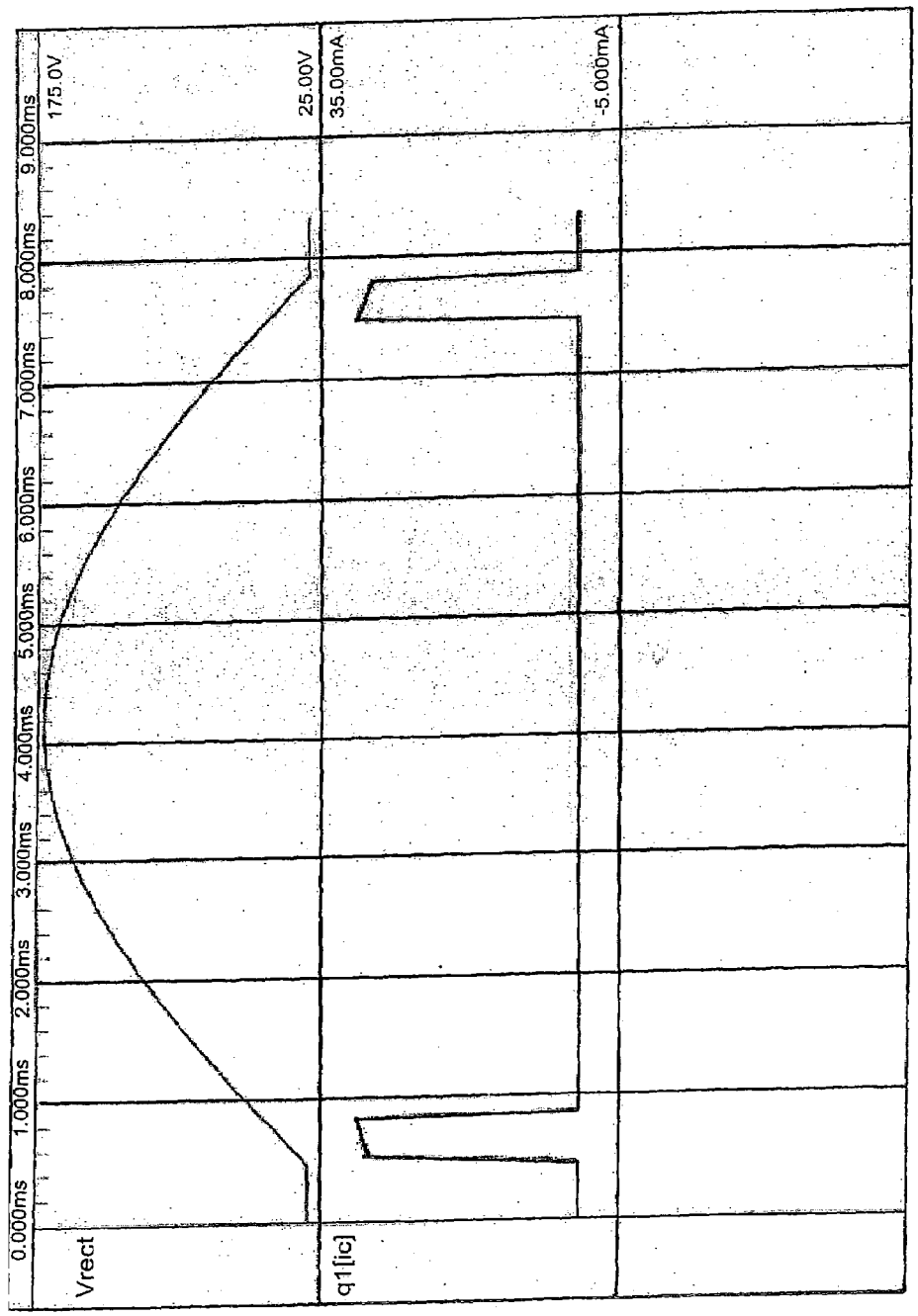
FIG. 19 illustrates the simulation result of the circuit shown in FIG. 13.

FIG. 19 is the simulation result of the circuit in FIG. 13. This is a single phase application where the number of LED in the group can be as low as one. The LED turns on briefly at the beginning and at the end of each one half cycle of the rectified power source.

During each and every half cycle of the rectified power source, there is at least a switch action from any of the phase switch and possibly from the over-voltage/over-power circuit. This switch action has the same (or multiple) of the power source's frequency. It can be used as a fundamental clock signal for various timing usage.

Figure 20:
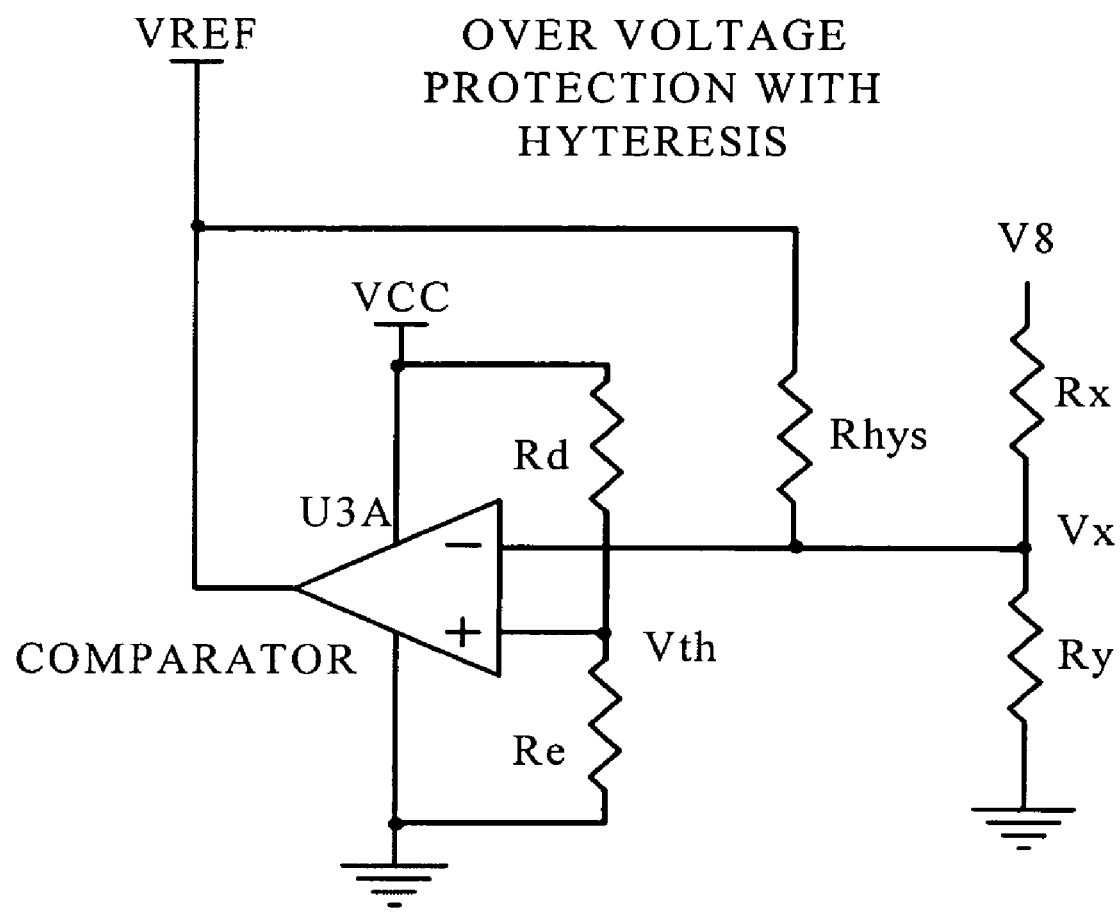
FIG. 20 illustrates an over-voltage circuit with hysteresis according to the present invention.

Hysteresis concept is well known in the analog design world. A hysteresis is added into a comparator circuit to alter the threshold level of a voltage or current when this voltage or current increases in comparison to its value when it decreases. One embodiment of the present invention utilizes this hysteresis concept to alter the threshold of the over-voltage circuit in the LED driver circuits to compensate for the changes in the LED voltage drop between on and off conditions. FIG. 3 shows an over-voltage circuit comprising U3A, Rd, Re, Rx and Ry. FIG. 20 shows the same over-voltage circuit but with added hysteresis by adding Rhys between VREF and Vx.

The following equations determine the over-voltage threshold and its hysteresis:

Vth=(Re/(Rd+Re))·Vcc

Vx=(VREF/Rhys+V8/Rx)·[1/(1/Rx+1/Ry+1/Rhys)]

Over voltage trips when V8 increases to a value which make Vx=Vth. Solve for V8:

V8trip=[Vth·(1/Rx+1/Ry+1/Rhys)−VREF/Rhys]·Rx

Now, as V8 increases from zero, Vx is lower than Vth and increasing. U3A output is high impedance (U3A is an open collector comparator) and VREF is at its normal voltage. So, V8LH=V8trip=[Vth·(1/Rx+1/Ry+1/Rhys)−VREF/Rhys]·Rx Where V8LH denotes the low to high (V8 increasing) over-voltage trip level. Once V8 increases above V8LH which makes Vx>Vth, U3A output pulls low and bring VREF to ground and alters V8 trip level.

V8HL=[Vth·(1/Rx+1/Ry+1/Rhys)−0V/Rhys]·Rx, or

V8HL=Vth·(1/Rx+1/Ry+1/Rhys)·Rx

Where V8HL denotes the high to low (V8 decreasing) over-voltage trip level that is larger than V8LH. The difference between V8HL and V8LH is the over-voltage trip level hysteresis. As Vrect increases, all LED groups sequentially turns on. After group 8 turns on, V8 increases with further increases in Vrect. Once Vrect increases to a level Vrect1 that causes V8 to reach V8LH threshold and trigger the over-voltage circuit to turn off all phases by pulling VREF to ground. When the LED phases are turned off, the voltage drop across the phases decreases which makes V8 larger with the same Vrect1 applied. V8HL is made to correspond to this larger V8 so that the over-voltage circuit de-actives at the same Vrect1 voltage level after Vrect increases to its peak and descend.

Embodiments disclosed above show 8 phase, 4 phase, and 1 phase applications. However, these circuits can be reduced or expanded from 1 phase to an N number of phases where N is any positive integer.

The reference voltages shown are either a constant DC value or an AC value following the input voltage wave shape. It is possible to make these values temperature dependent. Such variations are included in the embodiments even though not show explicitly. Applying such variations does not depart from the scope of this invention and disclosed embodiments.

Even though reference voltage is used throughout the embodiments, an obvious alternative is to use a reference current. Reference voltage and reference current are used interchangeably in the electronic industry. Using a reference current in place of the reference voltage in the disclosed embodiments does not depart from the scope and spirit of this invention.

The following are some examples of such variations: When the system temperature is high, it might be desirable to reduce the current limit to keep the LED's and other components within a safe operating temperature. On the other hand, the LED light output typically reduces at high temperature. If the LED's and other components in the system can handle high temperature, high power dissipation, then it might be desirable to increase the current limit to maintain a constant light output. In either cases, to vary the current limit up or down as a function of temperature, one can make either VREF or the current sensing resistor value temperature dependent. A Positive Temperature Coefficient (PTC), a Negative Temperature Coefficient (NTC), a bipolar junction (Vbe), a zener diode, etc. can be used to introduce an appropriate temperature dependency into VREF or the current sensing resistor.

The foregoing descriptions are intended to be illustrative only and not by way of limitation of the invention, as numerous further alternative embodiments in accordance with the invention will be apparent to those skilled in the art. Thus while certain preferred embodiments of the present invention have been disclosed herein, it will be obvious to those skilled in the art that various changes in form and detail may be made in the invention without departing from the spirit and scope of the invention as set out in the full scope of the following claims.

What is claimed is:

1. A driver circuit for driving light emitting diodes (LEDs) in multiphase, comprising:
    a string of LEDs divided into n groups, said n groups of LEDs being electrically connected to each other in series in a sequence from group 1 to group n, each group having an upstream end and a downstream end, and the downstream end of group m-1 being electrically connected to the upstream end of group m, where m is a positive integer equal to or less than n;
    a plurality of phase switches, each of the phase switches being coupled to the downstream end of a corresponding group at one end and coupled to a ground at the other end; and
    an over-voltage protection circuit and a hysteresis circuit to alter a voltage threshold of the over-voltage protection circuit where the over-voltage protection circuit de-activates.

2. The driver circuit of claim 1, wherein the phase switch comprises a transistor.

3. The driver circuit of claim 2, wherein the phase switch comprises a NPN darlington transistor, or a PNP darlington transistor, or a combination of these transistors connected in a cascade or a cascode configuration.

4. A driver circuit for driving light emitting diodes (LEDs) with over-voltage protection, comprising:
    a group of LEDs;
    a power source coupled to an upstream end of the group of LEDs to provide an input voltage;
    a phase switch coupled to a downstream end of the group of LEDs at one end and coupled to a ground at another end; and
    an over-voltage protection circuit and a hysteresis circuit to alter a voltage threshold of the over-voltage protection circuit where the over-voltage protection circuit de-activates.

5. The driver circuit of claim 4, wherein the phase switch comprises a transistor.

6. The driver circuit of claim 4, wherein the phase switch comprises a NPN darlington transistor, or a PNP darlington transistor, or a N-Channel MOSFET, or a P-Channel MOSFET, or a NPN bipolar transistor, or a PNP bipolar transistor, or an Insulated Gate Bipolar Transistor (IGBT), or an analog switch, or a relay, or a combination of these devices connected in a cascade or a cascode configuration.

* * * * *